Dec. 15, 1959 G. D. BECKER Re. 24,754

SEALS FOR GYRATORY CRUSHER SHAFTS

Original Filed May 14, 1957 2 Sheets-Sheet 1

Inventor
George D. Becker by Parker & Carter
Attorneys

SEALS FOR GYRATORY CRUSHER SHAFTS

Original Filed May 14, 1957 2 Sheets-Sheet 2

Inventor
George D. Becker by Parker & Carter
Attorneys

United States Patent Office

Re. 24,754
Reissued Dec. 15, 1959

24,754

SEALS FOR GYRATORY CRUSHER SHAFTS

George D. Becker, Wauwatosa, Wis., assignor to Nordberg Manufacturing Company, Milwaukee, Wis., a corporation of Wisconsin Original No. 2,878,082, dated March 17, 1959, Serial No. 659,134. May 14, 1957. Application for reissue July 24, 1959, Serial No. 829,478

9 Claims. (Cl. 308—142)

Matter enclosed in heavy brackets [ ] appears in the original patent but forms no part of this reissue specification; matter printed in italics indicates the additions made by reissue.

My invention relates to an improvement in supporting means for the crushing head of a gyratory crusher, and has for one purpose to provide an improved oil seal for the upper or suspended end of a gyratory crusher shaft.

Another purpose is to provide an oil seal applicable to the gyratory crusher spider from which the upper end of the shaft of a gyratory crusher is suspended.

Another purpose is to provide means for positioning such a seal as close as possible to the fulcrum point, or the point about which the upper end of the crusher shaft gyrates during the normal operation of the crusher.

Another purpose is to provide such a seal which is accessible for replacement and repair. Another purpose is to provide such a seal of maximum simplicity of structure coupled with efficiency of operation.

Another purpose is to provide such a seal in which any pumping or building up of oil pressures is avoided.

Other purposes will appear from time to time in the course of the specification and claims.

I illustrate my invention more or less diagrammatically in the accompanying drawings, wherein.

Like parts are indicated by like symbols throughout the specification and drawings.

Figure 1:
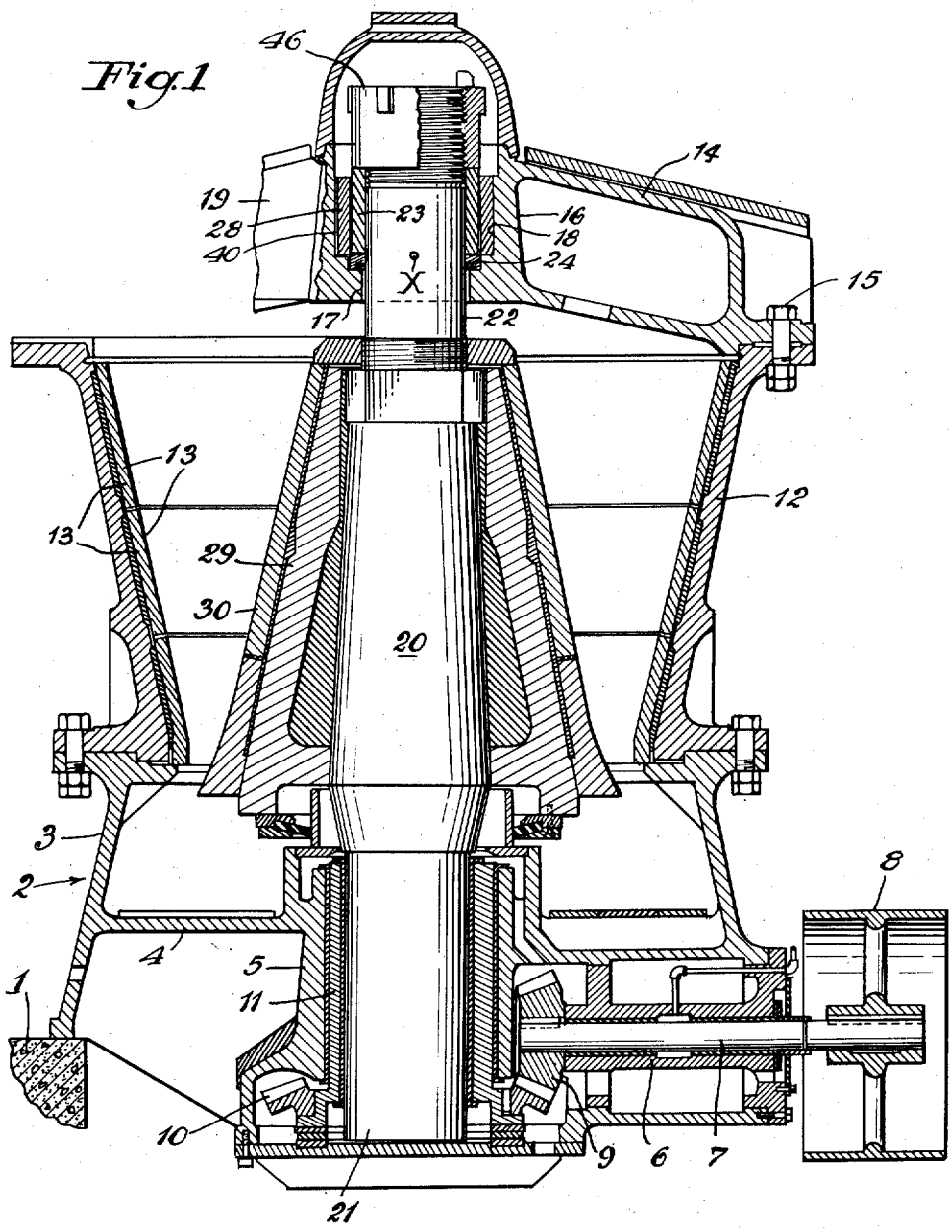
Figure 1 is a vertical axial section through a complete gyratory.

Referring to the drawings, 1 generally indicates any suitable supporting base upon which a main frame structure 2 is mounted. The structure 2 may include an outer circumferential frame member 3, horizontally extending connecting webs 4, a central fixed bearing hub 5, and a bearing assembly or sleeve 6 in which a suitable drive shaft 7 is positioned. This drive shaft may be driven by any suitable pulley 8, by belts or the like, from a source of power not herein shown.

The shaft is shown as having an inner pinion 9 in mesh with a bevel gear 10 connected to and driving an eccentrically apertured sleeve 11 in said hub. 12 indicates an upwardly and outwardly extending frame portion or bowl in which any suitable liner or liners 13 are positioned. 14 is a top spider assembly which may be centered in and secured to the bowl 12, as by bolts 15. The spider assembly supports an inner hub 16, having a bore 17 of lesser diameter, and an upward extension of such bore 18 of greater diameter. As will be clear from Figure [1] *2*, a ledge 19a is formed within the hub 16, extending inwardly from the bore 17. It teminates in a generally upright, generally cylindrical wall 19b which, in turn, terminates at its upper edge at an upper ledge 19 extending out to the bore 18. 20 is a gyratory shaft, the lower reduced portion 21 of which extends into the eccentric aperture of the sleeve 6. The shaft has an upwardly extending portion 22 extending upwardly through the minimum diameter bore 17 and into the upper larger diameter bore 18.

Figure 2:
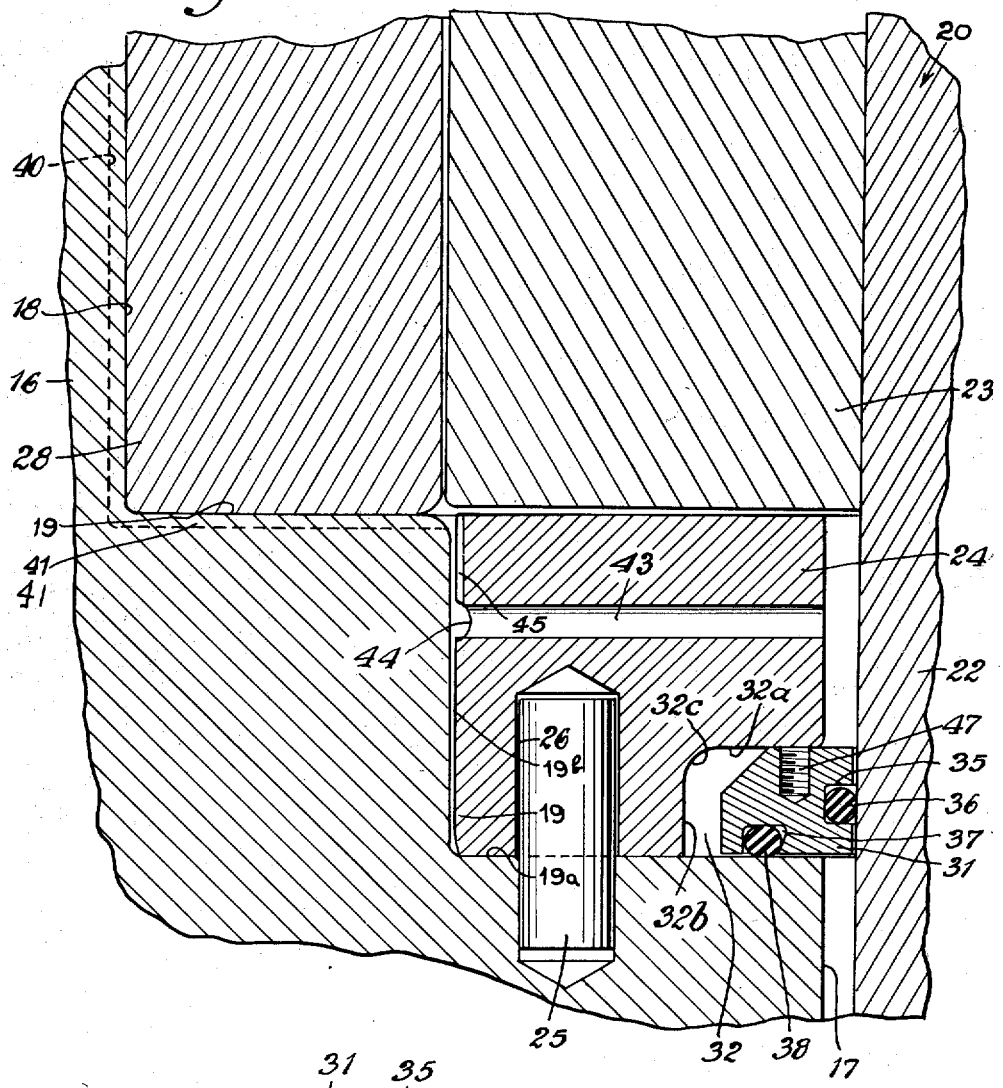
Figure 2 is a partial vertical axial section, on a considerably larger scale.
Figure 3:
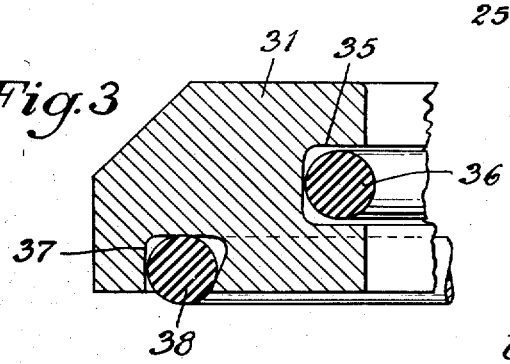
Figure 3 is a partial vertical axial section of a seal, on a still larger scale.

23 is a shaft suspension sleeve, suitably secured to the upper end of the shaft portion 22 and extending outwardly above the ledge or shelf portion 19a. 24 is a suspension ring mounted on the shelf portion 19a and secured in position, for example, by suitable positioning pins 25 which are held in suitable apertures in the ledge 19 and extend into appropriate and somewhat larger cylindrical apertures 26 in the suspension ring 24. 28 is a suitable spider bushing, resting on the shelf portion 19. It will be understood that sufficient clearance is provided at 17 to permit the shaft portion 22 to tilt slightly about its fulcrum or point of gyration X. As will be clear from Figure 2, the shaft suspension sleeve 23 surrounds and engages the crusher shaft 20. As the crusher shaft 20 gyrates about its point of gyration X the suspension sleeve 23 moves with it. In Figure 2 the lower surface of the suspension sleeve 23 is tilted upwardly away from the upper surface of the suspension ring 24. It will be understood, of course, that at other positions of the shaft the lower surface of the suspension sleeve abuts the upper surface of the suspension ring and the cylindrical outer surface of the suspension sleeve may also abut the opposed inner surface of the spider bushing 28. In other words, as the shaft 20 gyrates, an area of contact between the suspension sleeve 23 and the suspension ring 24 moves circumferentially about the ring 24. Figure 2 is to be taken as diagrammatic rather than as a working drawing, as the clearances have been indicated rather than accurately represented. The parts are so formed and proportioned as to permit such a slight gyration to take place, which, of course, is necessary, since the crushing action is imparted to the head by rotating the drive shaft 7 and the eccentrically apertured sleeve 11. This rotation moves the lower end or portion 21 of the crusher shaft in a generally circular path, to approach a suitable crushing head 29 and its mantle 30 to the opposed bowl 12 and the bowl liners 13. A problem solved by the present structure is the provision of adequate oil sealing means for the spider of the gyratory crusher.

Considering, specifically, the sealing means employed, I show an oil seal retainer ring 31 which rests slidably upon the upper surface of the horizontal shelf portion 19a. The suspension ring 24, upon which the suspension sleeve 23 of the crusher shaft assembly rests, is provided with a circumferential inner, lower recess 32. This recess has an upper horizontal face 32a, an inner cylindrical face 32b, and a connecting fillet 32c. The oil seal retainer ring 31 is received snugly in the recess. The oil seal retainer ring 31, in turn, has an inner circumferential channel 35 in its inner cylindrical wall, in which is positioned an O-ring 36. The O-ring is under compression between the inner wall of the channel and the opposite outer wall of the crusher shaft portion 22. The parts are so proportioned that, at all times, the O-ring 36 is under pressure and efficiently operates as a sealing member to prevent any undesired escape or flow of lubricant downwardly along the outer surface of the crusher shaft. The oil seal retainer ring 31 has in its lower surface an additional circumferential recess 37 which houses a second O-ring 38. It will be noted that the opposite walls or surfaces of the recess or channel 37 incline toward each other and are so shaped and proportioned that they will prevent the escape or loss of the O-ring 38, even when the sealing assembly is lifted upward from the shelf or ledge 19a.

In order to prevent any oil pumping action I provide a system of channels or vents or grooves in the various parts involved. I illustrate, for example, a wide groove in the spider wall, shown at 40. It extends downwardly a sufficient distance to communicate with a radial groove 41. Internal radial passages are also indicated, as at 43 in the suspension ring 24. A circumferential outer groove, as at 44, in the suspension ring, connects with a vertical extension passage 45. Thus, any tendency for building up of pressures or pumping of oil is prevented, it being understood that any suitable arrangement or combination of grooves and vents may be employed. Those herein shown have turned out to be practical.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I show herein a gyratory crusher which consists of an outer circumferentially extending bowl shown, for example, at 12, and a gyrated conic head, shown, for example, at 29. This head is mechanically gyrated or rolled against rock or ore which is fed downwardly from above into the crushing cavity defined by the head and bowl. As the eccentric 11 is rotated by the rotation of the shaft 7 the head is gyrated and opposes, in succession, a zone of nip or close approach, which moves around the crushing cavity.

The shaft assembly, including the conic head, is suspended in the above described spider bearing. The suspension is actually obtained by the employment of a flat supporting washer or suspension ring 24, which rests on the ledge 19a and which receives, on its upper surface, the lower face of the slightly beveled suspension sleeve 23. The beveling of the lower surface of the suspension sleeve 23 is clearly shown in Figure 2. The parts being thus shaped, there is always a level spot or area in contact with the supporting washer or ring 24. The suspension sleeve 23 is held in position on the shaft in any suitable manner, for example, by the threaded nut 46. It thus supports the head and shaft and takes the reaction due to the crushing of rock or ore in the crushing cavity.

Since very heavy thrust is received in a relatively limited area, it is important that proper lubrication be maintained. In earlier crusher models an upper bearing has been lubricated with oil, which had to be replenished frequently, there being no means to contain oil in the bearing. The present invention is directed to providing an efficient and simple sealing means to prevent the loss of lubricant. The suspension ring 24 and the oil seal retainer ring 31, in effect, divide the universal motion of the shaft 22 into a vertical sliding motion and a horizontal sliding motion. The turning motion can divide itself equally between the two O-rings 36 and 38. In practice, the oil sealer retainer ring 31 is so proportioned as to fit snugly in the aperture or bore 32. Its dimension from the O-ring 38 in the bottom to its smooth upper bearing surface is slightly greater than the corresponding distance in the cavity provided for the ring. This keeps the bottom O-ring 38 slightly flattened so that it has a high unit bearing pressure. The oil seal ring herein is further provided with a plurality of tap holes 47 in its upper surface. Thus, after the operator has removed the parts above the ring he can reach down into the bearing cavity with a properly formed rod or tool and attach the rods to the ring 31 by means of the tap holes, and easily remove it for replacement or repair.

In the present structure the replacement and repair from above of the spider bearing and oil seal structure is possible without completely dismanteling the upper portion of the crusher. The suspension sleeve 23, the suspension ring 24, and the spider bushing 28 may be upwardly removed, giving the operator access to the entire supporting and sealing structure. This can be done without disassembling or removing the crusher shaft.

Since the rolling action of the bearing bushings might act as a viscosity pump, if not vented, I employ, for example, the system of vents and grooves shown at 40, 41, 43 and 44. This vent system prevents building up of oil pressure and pumping.

I claim:

1. In a gyratory crusher having a suspended crusher shaft and head and a spider for suspending said shaft, said spider having a hub with an aperture through which the upper end of the crusher shaft may pass, and a generally horizontal ledge formed in said aperture, the shaft having a suspension sleeve at its upper end, supporting and sealing means for said shaft and head including a suspension ring in said aperture, having a lower surface engaging said ledge and an upper surface formed and positioned to receive the opposed lower surface of the shaft suspension sleeve, and sealing means for preventing the escape of oil downwardly along the surface of the crusher shaft and inwardly across the surface of the ledge, said sealing means including an oil seal retainer ring slidably supported on the surface of said ledge for movement in a horizontal plane generally perpendicular to the axis of the crusher shaft, and surrounding the outer surface of the crusher shaft, said retainer ring having a circumferential channel formed in its lower surface and another in its inner surface, and seal rings in each said channel formed and adapted to be constantly compressed respectively against the upper surface of the ledge and the outer surface of the crusher shaft, said retainer ring being free to slide on the surface of said ledge.

2. The structure of claim 1 characterized in that the retainer ring has apertures in its upper surface formed and adapted to receive a lifting tool, whereby the ring may be upwardly lifted from its seat, the channel in its lower surface being undercut, whereby to prevent the undesired escape of the seal ring when the bottom of the retainer ring is out of contact with the ledge.

3. The structure of claim 1 characterized in that the suspension ring is recessed about its lower inner edge snugly to receive the retainer ring.

4. The structure of claim 1 characterized in that the suspension ring is apertured to permit the passage of lubricant therethrough and by the provision of vents in communication with said apertures, whereby oil pumping in response to the gyration of the crusher shaft is prevented.

5. The structure of claim 1 characterized in that the retainer ring is located adjacent the level of the center of gyration of the crusher shaft, whereby amplitude of lateral movement of the crusher shaft at its zone of opposition to the retainer ring is reduced to a minimum.

*6. In a gyratory crusher having a crusher shaft and head and means for gyrating them, a spider for the upper end of the shaft, said spider having a hub with a generally vertical aperture positioned to surround the upper end of the shaft, said aperture having a generally horizontal outwardly extending lower ledge, a sleeve about said shaft having a lower face above said ledge, and sealing means between said shaft and spider including an oil seal retainer ring slidably supported on the surface of said ledge for movement in a horizontal plane generally perpendicular to the axis of the crusher shaft, said ring having a circumferential channel formed in a lower surface and a second such channel formed in its inner surface, and yielding sealing rings removably positioned in each of said channels and formed and adapted to be constantly compressed respectively against the upper surface of the ledge and the outer surface of the crusher shaft, said retainer ring being normally free to slide on the horizontal surface of said ledge, whereby, at all times, one of said sealing rings is under compression against the ledge and the other is under compression against the shaft.*

*7. The structure of claim 6 characterized by and including an additional ring mounted on the ledge and forming with the ledge a guiding slot for the oil seal retainer ring.*

*8. The structure of claim 6 characterized in that the oil seal retainer ring is apertured on its upper surface to receive a connection whereby it may be upwardly removed.*

*9. The structure of claim 6 characterized in that the oil seal retainer ring is located adjacent the level of the center of gyration of the crusher shaft, whereby amplitude of lateral movement of the crusher shaft at its zone of opposition to the retainer ring is reduced to a minimum.*

References Cited in the file of this patent or the original patent

UNITED STATES PATENTS

| | | |
|---|---|---|
| 557,216 | McCully | Mar. 31, 1896 |
| 2,492,006 | Raybould | Dec. 20, 1949 |
| 2,678,837 | Griefen | May 18, 1954 |